(12) United States Patent
Gauthier et al.

(10) Patent No.: US 6,781,355 B2
(45) Date of Patent: Aug. 24, 2004

(54) I/O POWER SUPPLY RESONANCE COMPENSATION TECHNIQUE

(75) Inventors: Claude R. Gauthier, Cupertino, CA (US); Aninda K. Roy, San Jose, CA (US); Brian W. Amick, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 41 days.

(21) Appl. No.: 10/274,165

(22) Filed: Oct. 18, 2002

(65) Prior Publication Data

US 2004/0076025 A1 Apr. 22, 2004

(51) Int. Cl.[7] .............................................. G05F 1/652
(52) U.S. Cl. ........................................................ 323/233
(58) Field of Search .................. 363/50, 55; 323/220, 323/232, 233, 299, 303, 908; 361/54, 56, 88, 111

(56) References Cited

U.S. PATENT DOCUMENTS

| 5,226,167 | A | * | 7/1993 | Yamaguchi | 332/107 |
| 5,383,080 | A | * | 1/1995 | Etoh et al. | 361/56 |
| 6,509,779 | B2 | * | 1/2003 | Yue et al. | 327/310 |

* cited by examiner

Primary Examiner—Matthew V. Nguyen
(74) Attorney, Agent, or Firm—Osha & May L.L.P.

(57) ABSTRACT

An apparatus for compensating for the effects of resonance in an integrated circuit's power distribution network is provided. A resonance detector monitors transmissions from the integrated circuit for certain bit patterns that may excite the power distribution network at a specific frequency and cause power supply resonance. Power supply resonance causes an increase in power supply impedance. When offending transmissions are detected, the resonance detector activates a damping element on the integrated circuit which dampens the resonance. The damping element is a resistive device between two power supply lines that decreases power supply impedance when activated.

20 Claims, 10 Drawing Sheets

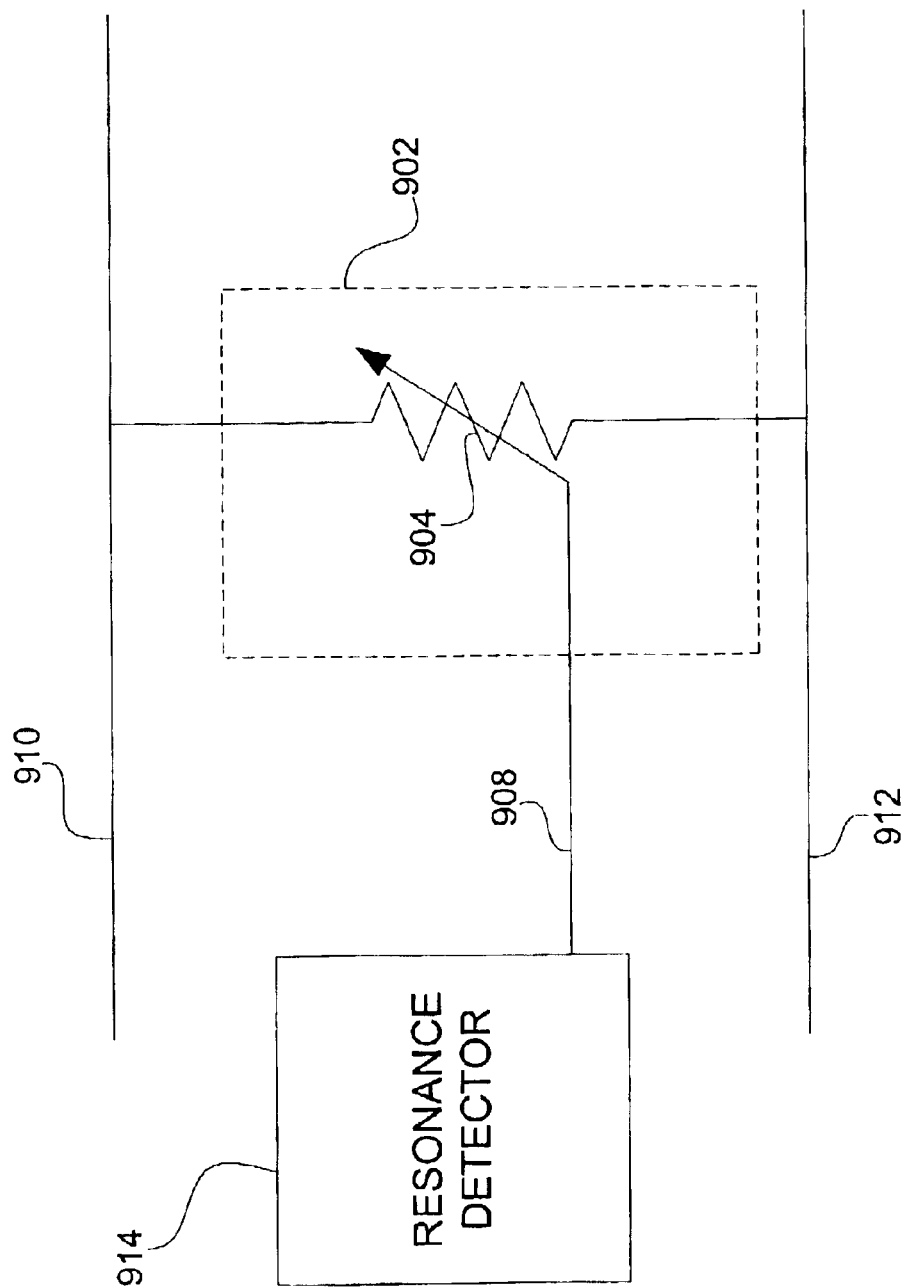

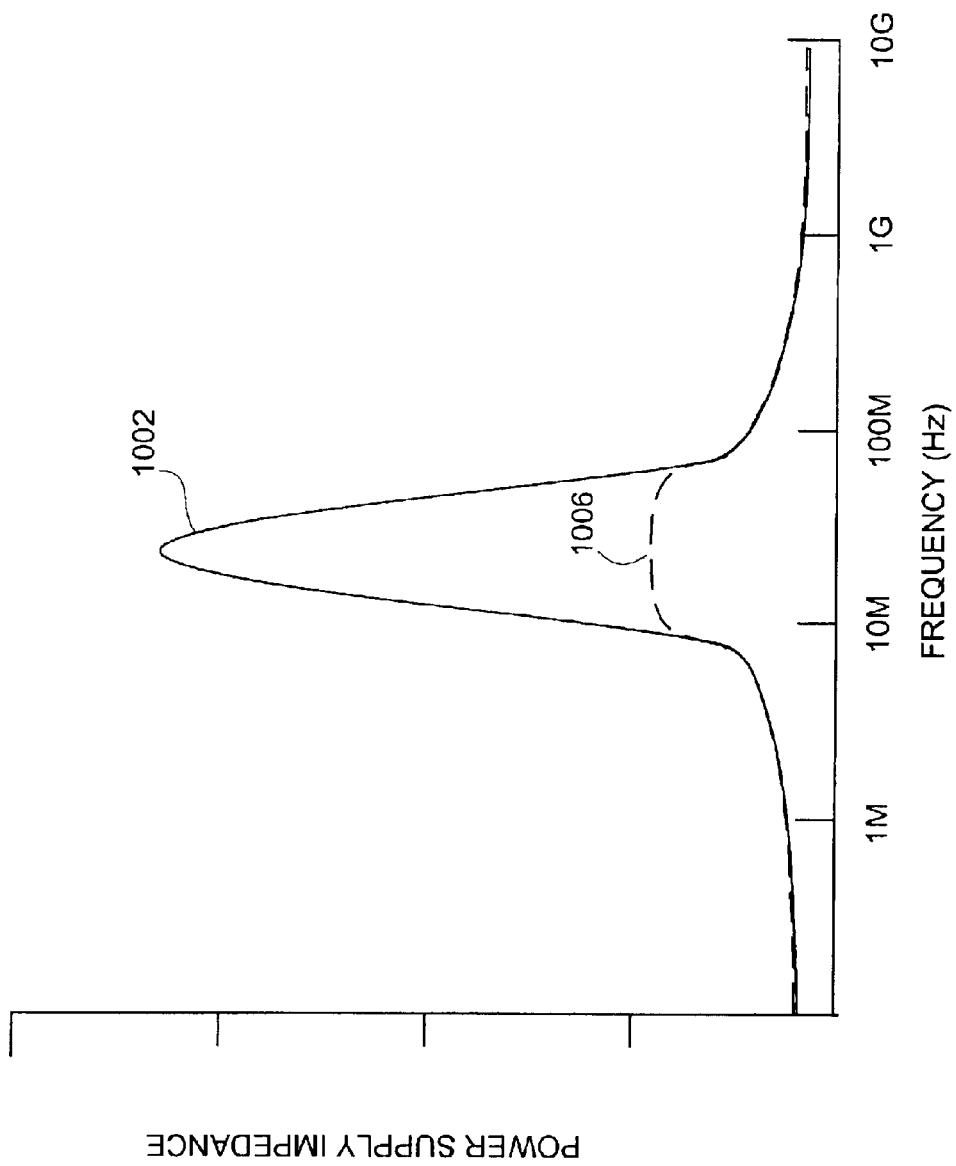

I/O POWER SUPPLY RESONANCE COMPENSATION TECHNIQUE

BACKGROUND OF INVENTION

Power supplied to an integrated circuit (IC) occurs through a power distribution network. The power distribution network starts with a power supply that generates an appropriate DC voltage. The power supplied to the IC must traverse from the power supply across the power distribution network before it reaches the IC. The power distribution network has characteristics that may affect the operation of the IC.

FIG. 1 shows a conventional IC system (10). The IC system (10) includes a printed circuit board (PCB) (12). The PCB (12) is a central platform on which various components are mounted. The PCB (12) has multiple layers that contain traces that connect the power supply and signals to the various components mounted on the PCB (12). Two layers, a system power supply layer (14) and a system ground layer (16), are shown in FIG. 2.

The system power supply layer (14) and the system ground layer (16) provide power to an IC (20). The power supplied to the IC (20) traverses the system power supply layer (14) and the system ground layer (16) from a DC source (not shown) to a package (18) on which the IC (20) is mounted. Other components are also mounted on the PCB (12) that generally attempt to maintain a constant voltage supplied to the IC (20). These components may include, but are not limited to, an air-core inductor (24), a power supply regulating integrated circuit (26), switching transistors (28), a tantalum capacitor (30), and electrolytic capacitors (32).

A variety of different types and different locations of capacitors are used to help maintain a constant voltage supplied to the IC (20). Electrolytic capacitors (32) mounted on the PCB (12) connect between the system power supply layer (14) and the system ground layer (16). The package (18), similar to the PCB (12), may include multiple planes and interconnections between the planes to provide a connective substrate in which power and data signals traverse. Ceramic capacitors (22) mounted on the package (18) connect between a package power supply signal (not shown) and a package ground signal (not shown).

Due to active switching of circuit elements on the IC (20), the power required by the IC (20) changes. The active switching causes power supply noise. Additional components may be included to minimize such power supply noise. For example, ceramic capacitors (22) near the IC (20) act as local power supplies by storing and dissipating charge as needed.

The addition of components reduces the power supply impedance at most frequencies; however, localized impedance peaks may exist. The impedance peaks indicate a power supply resonance. The power supply resonance is formed when parasitics in the power distribution network and components connected to the power distribution network are excited at a particular frequency. The parasitics include the inherent inductance, resistance, and capacitance that may exist in the IC (20) (or other integrated circuits), package (18), and power distribution network. In particular, the power supply resonance may be formed from the power distribution network and a "parasitic tank circuit" that includes the chip capacitance and package inductance.

FIG. 2 shows a schematic of a power distribution network for an IC (296). The power distribution network is represented by impedances $Z_1$ (204), $Z_2$ (206), and $Z_3$ (208). Each of these impedances (204, 206, 208) may include resistive, inductive, and capacitive elements. Two power supply lines (292, 294) supply power to the IC (296) located between the two power supply lines (292, 294). The impedances (204, 206, 208) model both the inherent parasitics of the power distribution network and added components.

On the IC (296), various forms of chip capacitance may be used to further stabilize the power supply. Low equivalent series resistance (ESR) local decoupling capacitors are modeled by resistor (262) and capacitor (264). High ESR global decoupling capacitors are modeled by resistor (266) and capacitor (268). Non-switching logic on the IC (296) is modeled by resistor (270) and capacitors (272, 274). Switching logic on the IC (296) is modeled by variable resistors (276, 278) and capacitors (280, 282).

In FIG. 2, the schematic of the power distribution network may be used to simulate the power supply impedance observed by the IC (296), as represented by "Z." To measure the power supply impedance, a 1 Ampere AC current source (290) injects current onto power supply line (292). The measured voltage, VM, between the two power supply lines (292, 294) may be used to calculate the power supply impedance. The impedance Z is equal to VM divided by the 1 Ampere AC current source (290). By varying the frequency of the 1 Ampere AC current source (290), a frequency versus impedance relationship may be determined.

A representative graph of power supply impedance is shown in FIG. 3. Over a particular range of frequencies for the switching logic on the IC (296), the power supply impedance increases because the circuit formed by the chip and package resonates. A spike in a power supply impedance curve (302) has the effect of current-starving the IC (296 in FIG. 2). When the IC is current-starved, some voltage potentials on the IC (296 in FIG. 2) may shift from their desired values. Accordingly, an increase in the power supply impedance may cause undesired operation of the IC (296 in FIG. 2).

SUMMARY OF INVENTION

According to one aspect of the present invention, a computer system comprises a power distribution network arranged to propagate at least one voltage potential to an integrated circuit; a resonance detector arranged to detect a transmission from the integrated circuit to a receiver, wherein the transmission causes a power supply resonance; and a damping element operatively connected to the resonance detector and the power distribution network, where the damping element is on the integrated circuit, and where the damping element dampens the power supply resonance under control of the resonance detector.

According to one aspect of the present invention, a method for reducing a power supply resonance comprises propagating at least one voltage potential from a power supply to an integrated circuit; transmitting data from the integrated circuit to a receiver; detecting the transmitting for a transmission that causes the power supply resonance; and damping the power supply resonance dependent on the detecting.

According to one aspect of the present invention, an apparatus for reducing a power supply resonance comprises means for propagating at least one voltage potential from a power supply to an integrated circuit; means for detecting a transmission from the integrated circuit, where the transmission causes the power supply resonance; and means for damping the power supply resonance dependent on the means for detecting.

BRIEF DESCRIPTION OF DRAWINGS

FIG. 9 shows a schematic of a resonance detector and damping element in accordance with an embodiment of the present invention.

FIG. 10 shows a graph depicting power supply system impedance in accordance with an embodiment of the present invention.

DETAILED DESCRIPTION

Embodiments of the present invention relate to a method for reducing power supply resonance.

Conventional approaches have focused on the clock frequency's relationship to the power supply resonance frequency. Much of the switching logic will operate at this frequency, and so if it closely matches the resonant frequency of the power distribution network, power supply resonance can be observed. However, even if the clock frequency is significantly different than the resonant frequency, certain patterns of transmitted bits may occur at the power supply resonant frequency, causing power supply resonance effects in a system.

Figure 4:
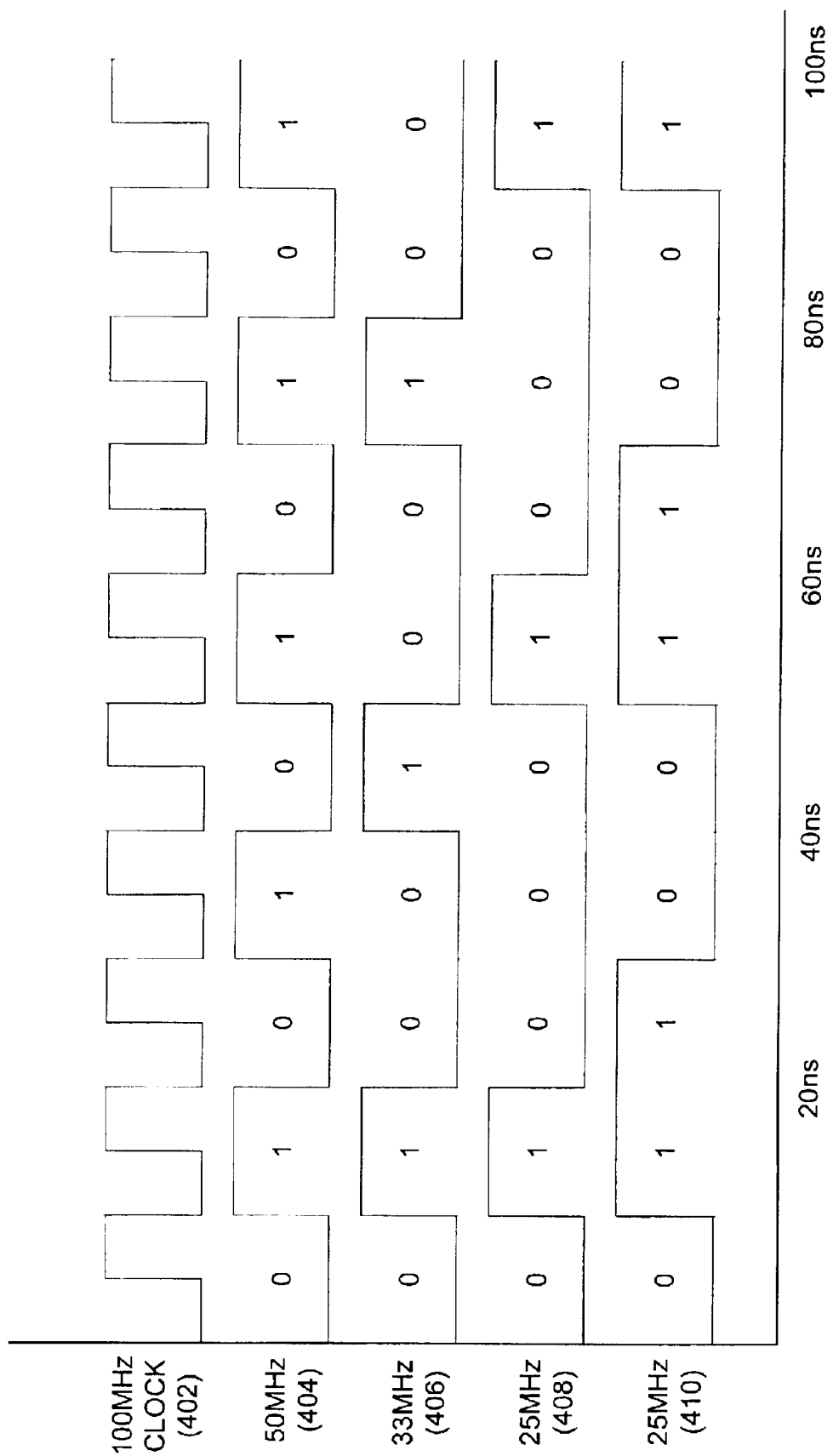
FIG. 4 shows a graph of I/O bit patterns in accordance with an embodiment of the present invention.

FIG. 4 shows several exemplary bit patterns based on a 100 MHz clock frequency that may excite a circuit at frequencies other than 100 MHz. The clock signal (402) is shown on the top line of the graph. Input data bits in this clock's system are latched every 10 nanoseconds (at 5 ns, 15 ns, 25 ns, etc. in FIG. 5). The data is held steady during the positive clock edges.

The second line (404) on the graph shows an alternating bit pattern: "0101010101." If a binary one is sent every other clock cycle, energy is input to the system every other clock cycle, for a resulting frequency of 50 MHz. The third line (406) on the graph shows the bit pattern: "0100100100," inputting energy every third clock cycle. With this bit pattern, energy is input to the system at 33 MHz. The fourth line (408) on the graph shows a bit pattern with a binary one every fourth clock cycle, inputting energy at 25 MHz. The fifth signal (410) on the graph shows a different 25 MHz signal. The bit pattern is "0011," and its duty cycle is 50%. Bit patterns with a 50% duty cycle have the strongest effect in inciting resonance. If any of the frequencies generated by a particular bit pattern matches the resonant frequency of the chip, the circuit may malfunction.

Data to be transmitted between integrated circuits passes through high power transmission amplifiers before being transmitted from one integrated circuit to another. These signals are greatly amplified on an integrated circuit and may have a relatively large effect on a power distribution network. If a frequency of data transmitted between integrated circuits occurs at a resonant frequency, the power distribution network may excite the power supply impedance spike described above. Accordingly, integrated circuits connected to the power distribution network may be current-starved and may malfunction. Data transmitted between integrated circuits is a significant contributor to switching-induced power supply resonance.

Figure 1:
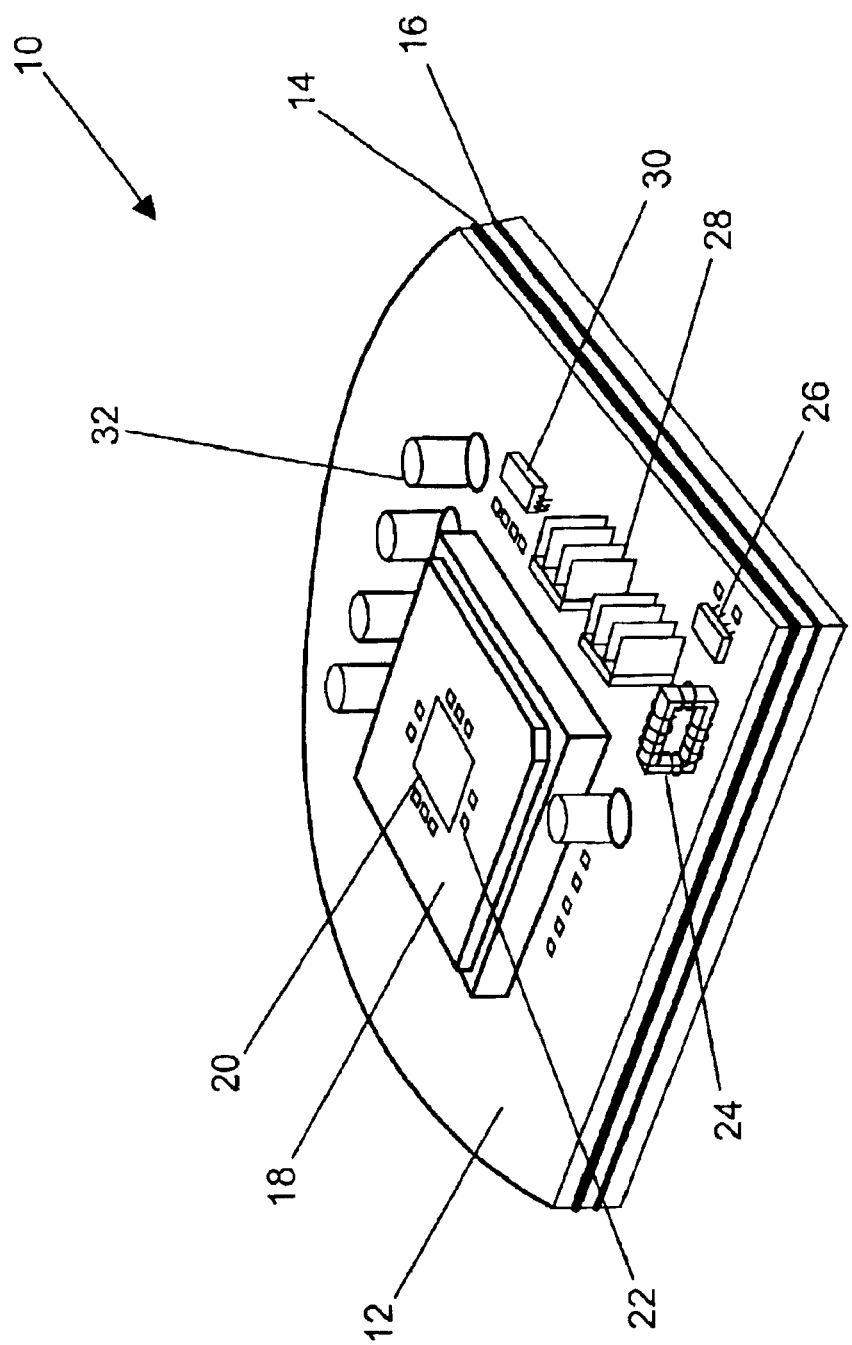
FIG. 1 shows a prior art integrated circuit system.
Figure 2:
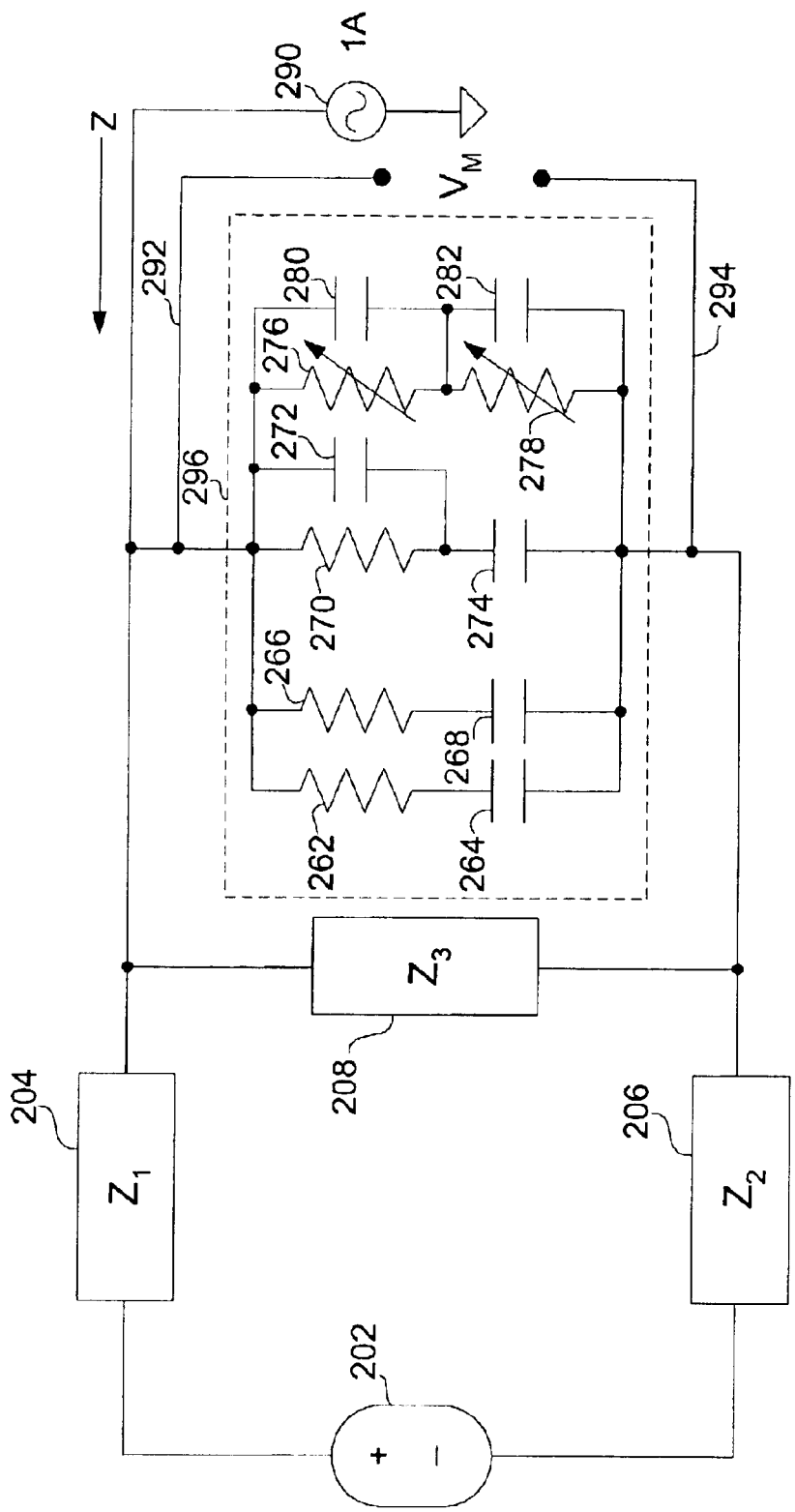
FIG. 2 shows a schematic of a power distribution network for an integrated circuit.
Figure 5:
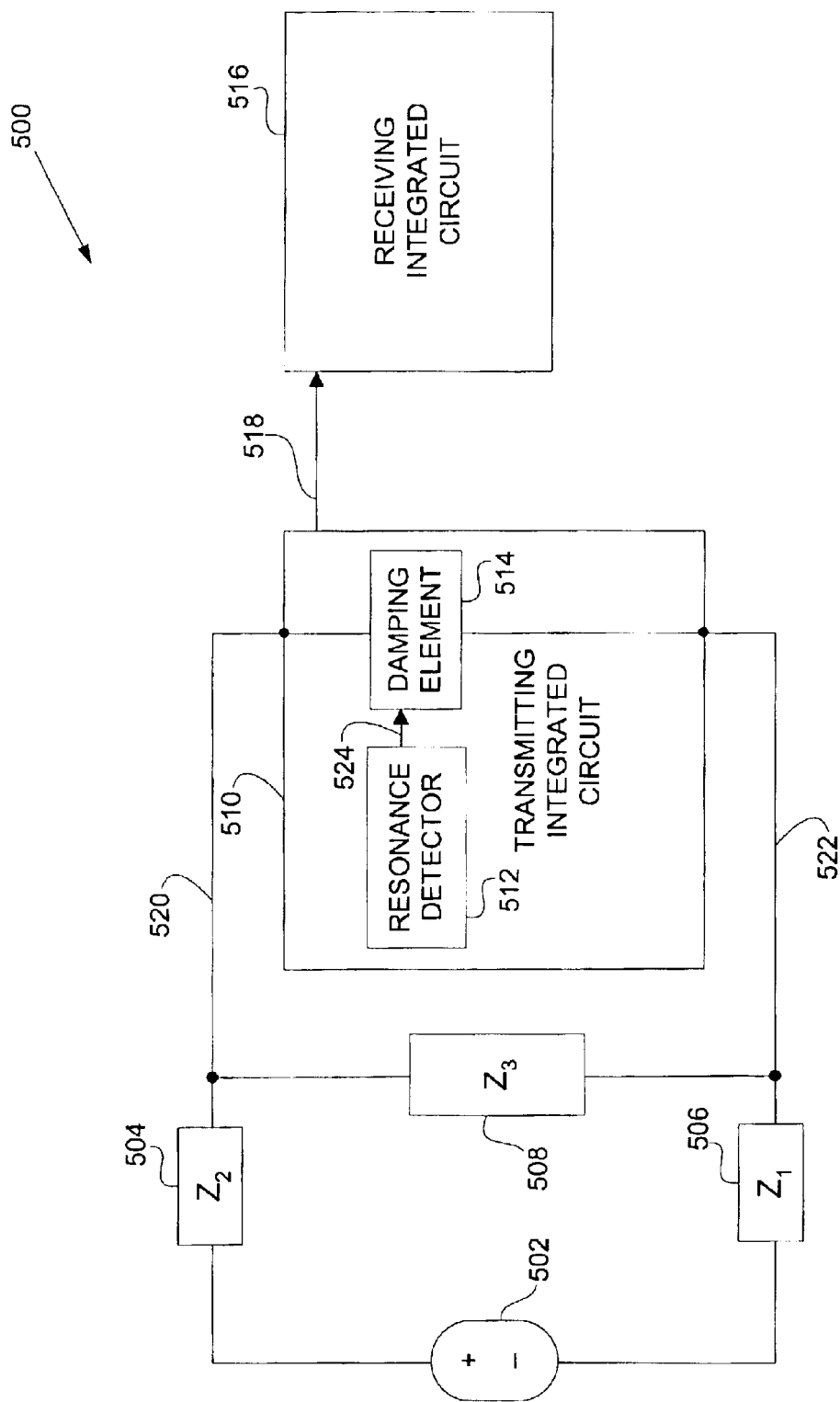
FIG. 5 shows a block diagram of a power supply resonance compensation system in accordance with an embodiment of the present invention.

FIG. 5 shows a block diagram of a power supply resonance compensation system (500) in accordance with an embodiment of the present invention. In FIG. 5, a transmitting IC (510) is connected to a power supply (502) with two power supply lines (520, 522). The transmitting IC (510) transmits data to a receiving IC (516) on line (518). The parasitic impedances $Z_1$ (504), $Z_2$ (506), and $Z_3$ (508) (204, 206, 208 shown in FIG. 2) are shown.

Embodiments of the present invention use a damping element (514) on the transmitting IC to dampen a power supply resonance and a resonance detector (512) to determine when the damping element (514) should be activated. The resonance detector (512) uses line (524) to control the damping element (514). Under non-resonant conditions, the damping element (514) should approximate an open circuit, thereby dissipating no power when it is not needed. The resonance detector (512) monitors transmissions between the integrated circuits (510, 516) on line (518) and determines whether a transmission will cause a power supply resonance condition. If a transmission is determined to cause a power supply resonance condition, the resonance detector (512) will activate the damping element (514) so that the damping element (514) may damp the power supply resonance.

According to one or more embodiments of the present invention, the resonance detector (512) may store a list of bit patterns known to cause power supply resonance. Transmissions monitored by the resonance detector (512) would be compared to the list of offending bit patterns. Upon discovery of such a pattern, the resonance detector (512) enables the damping element (514) to dampen the impending power supply resonance caused by the offending bit pattern.

Because the first bit of an offending bit pattern may come at any time in a series of bits, a shift register may be used as part of the pattern detecting system. The bits to be transmitted would be fed through the shift register so that the pattern being transmitted could be "moved" with respect to the pattern it is being compared to. If at any time during the transmitted pattern's traversal of the shift register the transmitted pattern matches the pattern it is being compared to, the resonance detector (512) has detected an offensive bit pattern.

According to one or more embodiments of the present invention, the resonance detector (512) may perform a frequency analysis on the transmitted data signal. A frequency analysis algorithm may be used to determine the frequency content of the signal. Fourier analysis (e.g., Fast Fourier Transform) or wavelet analysis may be used to determine the frequency content of the signal. After determining the resonant frequency of an integrated circuit and power distribution network combination, frequencies generated by offending bit patterns are programmed into the resonance detector (512). During operation, bit patterns are transformed into the frequency domain, and the resonance detector (512) in turn looks for frequency content near the resonant frequency. The damping element (514) may be enabled if the signal contains enough energy near the resonant frequency to induce power supply resonance.

Signal frequency content near harmonics of the resonant frequency (i.e., frequencies that are integer multiples of the resonant frequency) may also cause power supply resonance. In one or more embodiments, a frequency analysis-based resonance detector may be programmed to be responsive to harmonic frequencies of the resonant frequency as well as the resonant frequency itself.

In FIG. 5 the resonance detector (512) is shown as a part of the transmitting IC (510). One of ordinary skill in the art will understand that the resonance detector (512) may also be included as a part of the receiving IC (516), or it may be included on a third IC (not shown) separate from the transmitting IC (510) and the receiving IC (516). The resonance detector (512) may also be a separate IC on the package of either the first or second IC.

Figure 6:
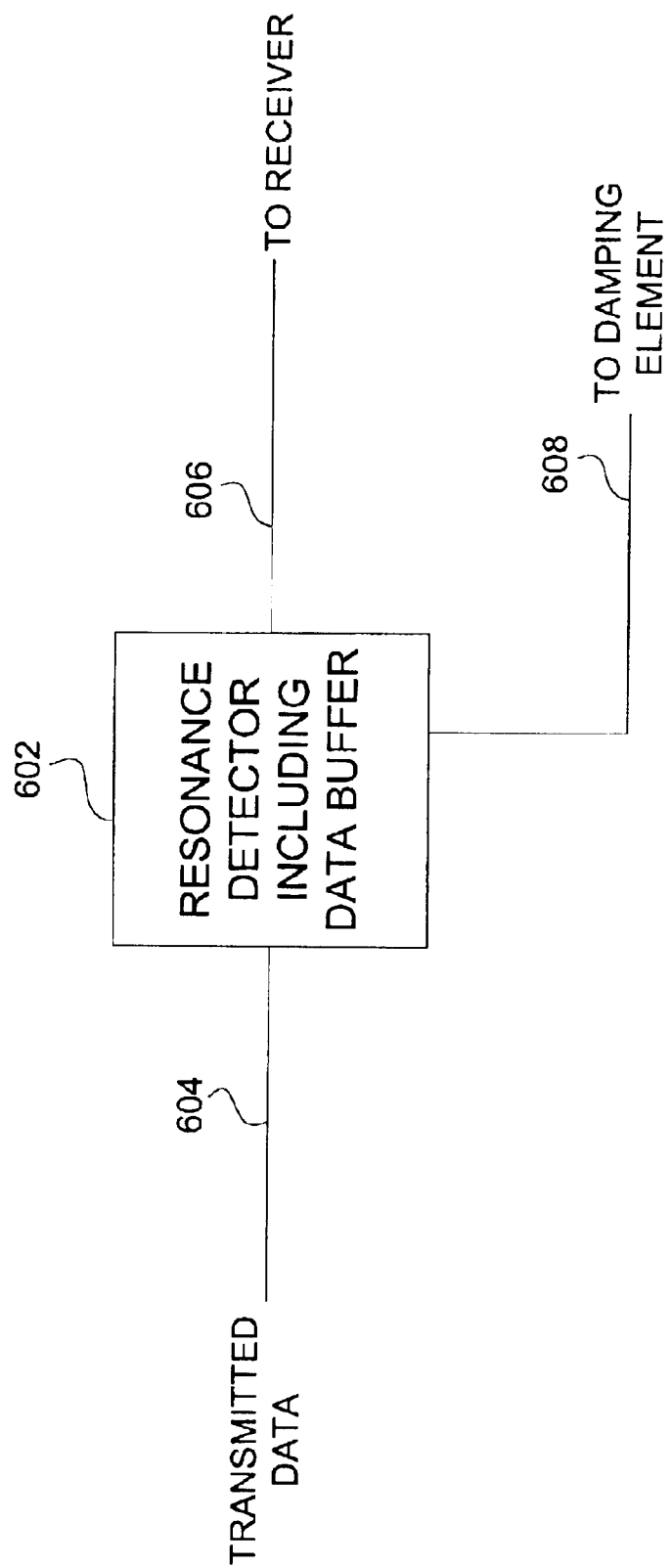
FIG. 6 shows a block diagram of a resonance detector system in accordance with an embodiment of the present invention.

FIG. 6 shows a block diagram of a resonance detector system in accordance with an embodiment of the present invention. Data transmitted on line (604) is sent to the resonance detector (602). The resonance detector (602) includes a data buffer that latches the transmitted data for analysis. The transmitted data is then passed on to the intended receiver on line (606). If the resonance detector (602) determines that a transmission will cause power supply resonance, the resonance detector (602) activates the damping element (not shown) using line (608).

Figure 7:
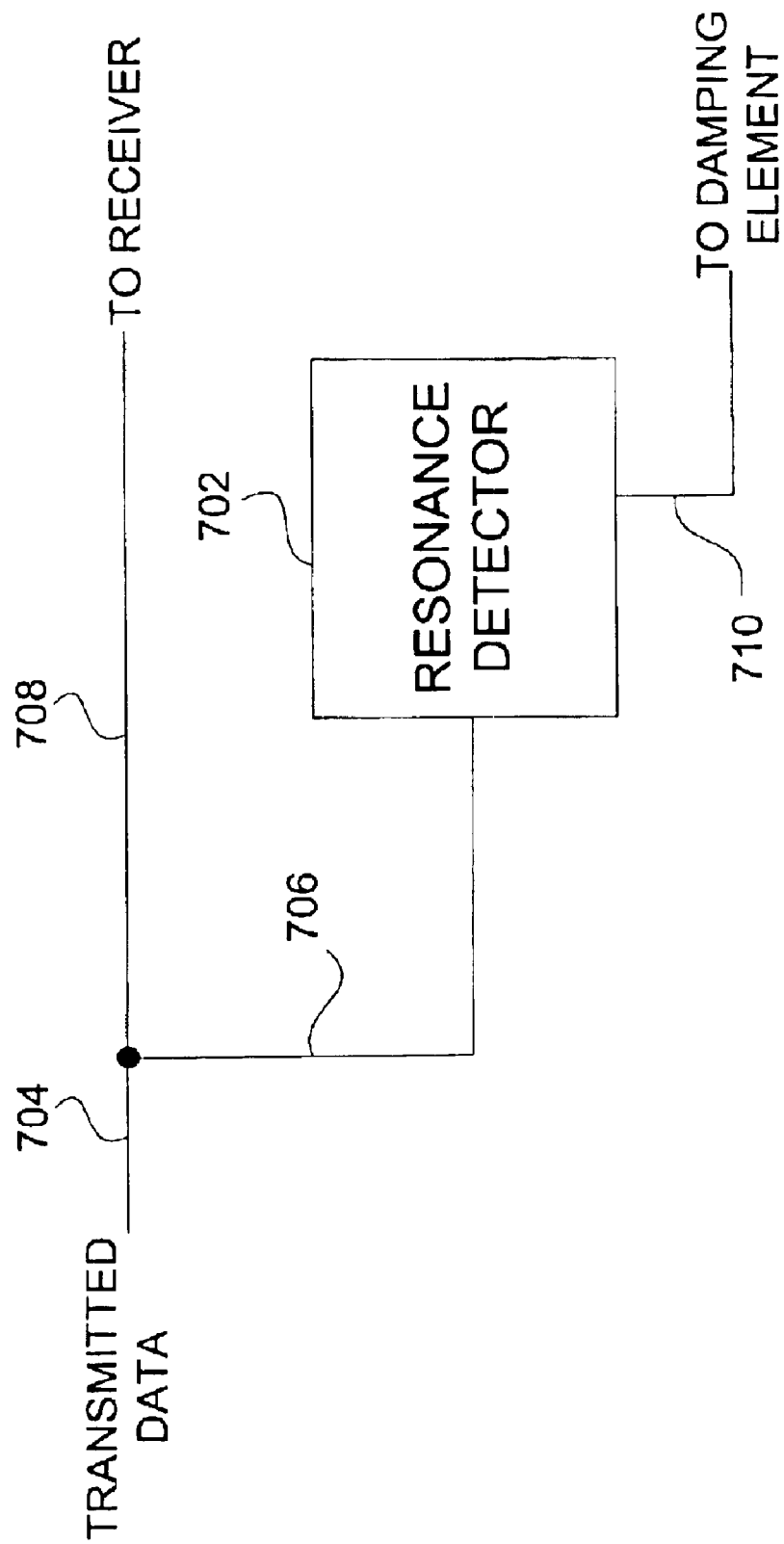
FIG. 7 shows a block diagram of a resonance detector system in accordance with an embodiment of the present invention.

One of ordinary skill in the art will understand that other configurations are possible. FIG. 7 shows a block diagram of an exemplary resonance detector system in accordance with an embodiment of the present invention. The resonance detector (702) may monitor transmissions between integrated circuits without being disposed between transmitter (not shown) and receiver (not shown) as in FIG. 6. One of ordinary skill in the art will understand that lines (704), (706), and (708) represent the same electrical node. Data to be transmitted is sent on line (704), which splits into lines (708) and (706). Line (708) continues to carry the data on to the intended receiver, while line (706) supplies a copy of the transmitted data to the resonance detector (702). If the resonance detector (702) determines that a transmission will cause power supply resonance, the resonance detector (702) activates the damping element (not shown) using line (710).

Figure 8:
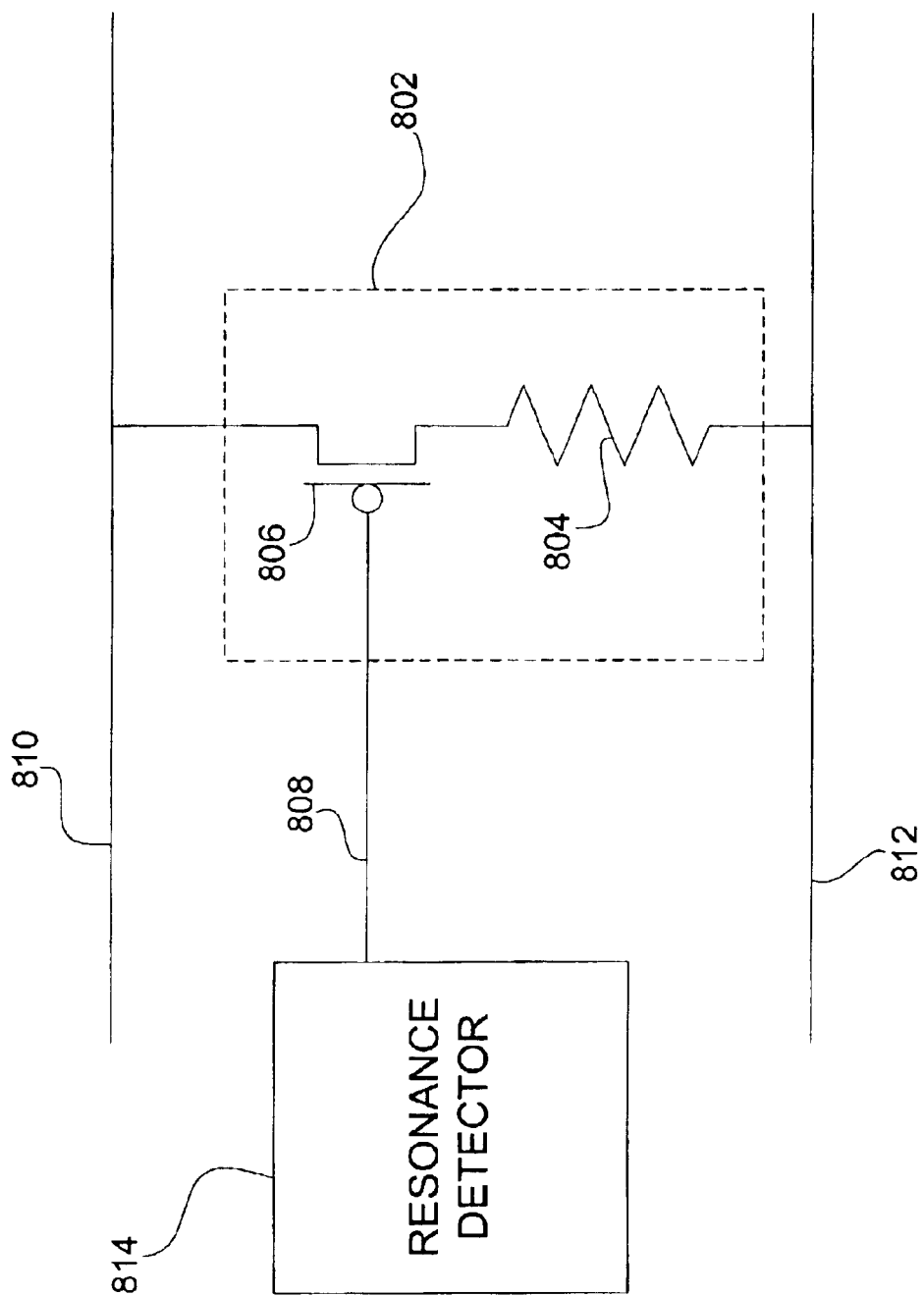
FIG. 8 shows a schematic of a resonance detector and damping element in accordance with an embodiment of the present invention.

As shown in FIG. 8, according to an embodiment of the present invention, a damping element (802) may be a resistor (804) in series with a PMOS transistor (806) operating as a switch. A resonance detector (814) supplies a high voltage potential to the gate of the transistor under non-resonant conditions, so that the damping element (802) is essentially an open circuit. When a power supply resonance-inducing transmission is detected, the resonance detector (814) supplies a low voltage potential to the transistor (806) using line (808), causing the transistor (806) to behave as a short circuit, thereby creating a resistance between the two power supply lines (810, 812). The resistor (804) between the power supply lines (810, 812) will dampen the power supply resonance. When an offending transmission is over or damping is no longer required, the resonance detector (814) will turn "off" the transistor (806).

One of ordinary skill in the art will understand that an NMOS transistor could also be used in this configuration. The NMOS transistor may connect to power supply line (812) with the resistor (804) connected to power supply line (810). The resonance detector (814) applies a voltage to the gate of the NMOS transistor while a power supply resonance inducing transmission is detected.

Those skilled in the art will note that the control scheme used for this switch-mode operation is called "bang—bang control" because the control signal "bangs" between two discrete values (i.e., ON and OFF) as some parameter (i.e., frequency of transmitted bits) enters and leaves an appropriate operating range (i.e., near resonance and away from resonance, respectively).

As shown in FIG. 9, according to an embodiment of the present invention, a damping element (902) may be a digital potentiometer (904) under control of a resonance detector (914). The resonance detector (914) sends control information on a line (908) to the potentiometer (904) that controls the resistance between the two power supply lines (910, 912). For proper operation under non-resonant conditions, the potentiometer (904) may be set to a very high resistance so that it may act as an open circuit.

A potentiometer (904) has the advantage of being tunable and continuously variable. If the resonance detector (914) detects a transmission that may cause a small power supply resonance, the resonance detector (914) may respond appropriately by setting the potentiometer (904) to a slightly lower value than its open circuit mode. Accordingly, the power supply resonance is effectively damped while the damping element (902) dissipates as little power as necessary. If the resonance detector (914) detects a transmission that will induce a larger power supply resonance, the resonance detector (914) may set the potentiometer (904) to relatively low resistance value to dampen the larger power supply resonance.

In one or more embodiments, various different control schemes may be used to control the damping element (902). Proportional, integral, differential (PID) control is one control method that could be employed by the resonance detector (914). The resonance detector's (914) PID parameters may be selected to optimize at least one aspect of the system's performance. Depending on the application, the goal of the optimization may be to minimize the amplitude of a power supply resonance, to minimize the duration of a power supply resonance, or to minimize power dissipated by the damping element.

One of ordinary skill in the art will understand that there are many other potential embodiments of a damping element. The minimum requirements are that the damping element be controllable by a resonance detector, and that the damping element be able to dampen a power supply resonance. In one or more embodiments, the power supply resonance is dampened by lowering a power supply impedance.

Figure 3:
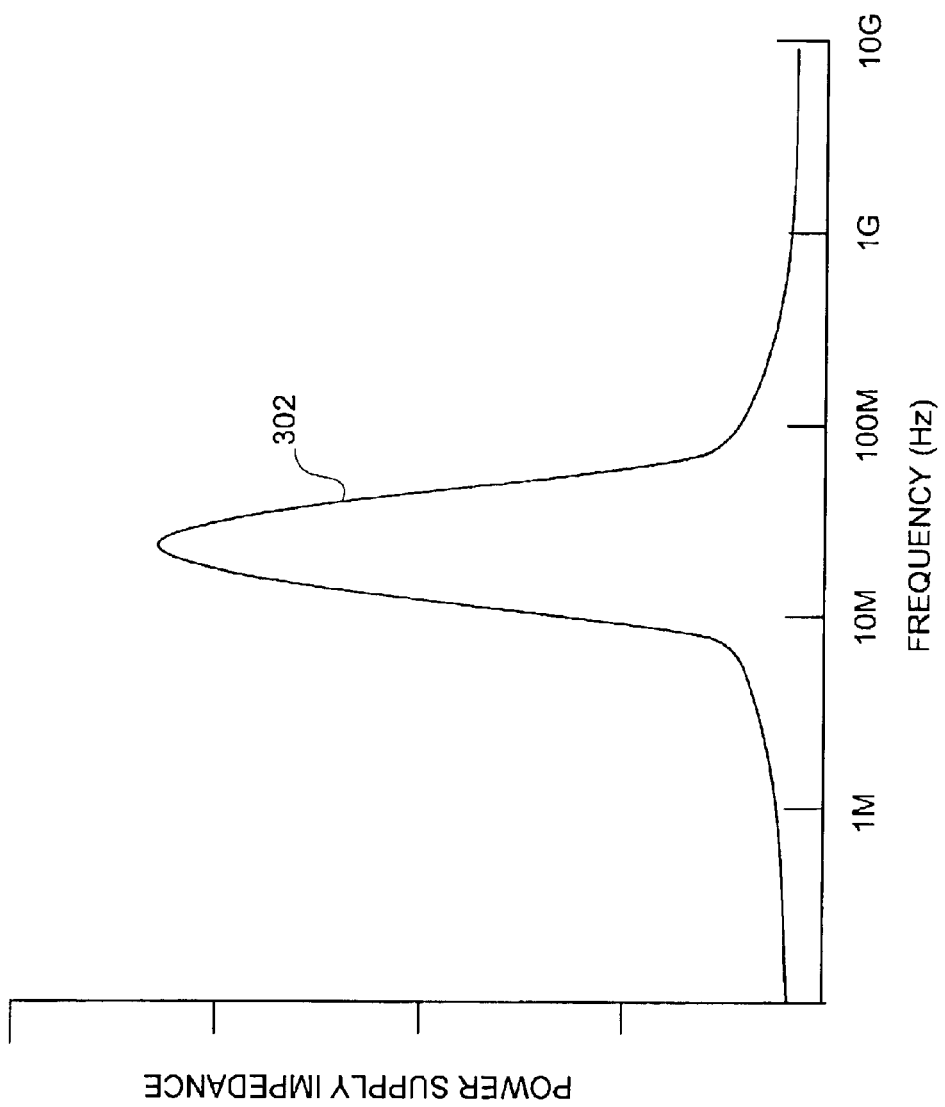
FIG. 3 shows a graph depicting power supply system impedance.

FIG. 10 shows a graph depicting power supply system impedance in accordance with an embodiment of the present invention. Power supply impedance curve (1002) displays a power supply impedance curve (1002) without the influence of the present invention as shown in the power supply impedance curve (302) in FIG. 3. Power supply impedance curve (1006) shows a relationship of impedance to frequency under the influence of the present invention. Away from the resonant frequency, the two power supply impedance curves (1002, 1006) are approximately equivalent. Accordingly, a damping element is an open circuit at these frequencies. In other words, at such non-resonant frequencies, the damping element, for example damping element (802) in FIG. 8, has no effect on the power distribution network. Near the resonant frequency, the resonance detector activates the damping element, for example damping element (802) in FIG. 8, and the power supply resonance is attenuated.

Advantages of the present invention may include one or more of the following. In one or more embodiments, the present invention may dampen a power supply resonance in a power distribution network, thereby improving system performance.

In one or more embodiments, the present invention may limit the amount of power dissipated by the damping element while still effectively damping power supply resonance.

In one or more embodiments, the present invention may allow control over how a power supply resonance is damped. Amplitude of the power supply resonance, duration of the power supply resonance, or power dissipated by the damping element may be minimized.

Some power supply resonance-inducing transmissions may occur unpredictably. In one or more embodiments, the present invention may detect such power supply resonance-inducing transmissions, and the resulting power supply resonance may be damped.

In one or more embodiments, the present invention's damping element will only dissipate power when a power supply resonance exists and requires damping, thereby dissipating power only when needed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a power distribution network arranged to propagate at least one voltage potential to an integrated circuit;
   a resonance detector arranged to detect a transmission of data to a receiving integrated circuit from the integrated circuit, wherein the transmission causes a power supply resonance; and
   a damping, element operatively connected to the resonance detector and the power distribution network, wherein the damping element resides on the integrated circuit, and wherein the damping element dampens the power supply resonance under control of the resonance detector.

2. The computer system of claim 1, wherein the resonance detector is part of at least one selected from the group consisting of the integrated circuit, a package of the integrated circuit, the receiving integrated circuit, and a separate resonance detecting device.

3. The computer system of claim 1, wherein the resonance detector compares a transmitted bit pattern to at least one stored bit pattern, wherein the at least one stored bit pattern is representative of a bit pattern that may cause the power supply resonance.

4. The computer system of claim 3, wherein the resonance detector uses a shift register to detect when the transmitted bit pattern matches the at least one stored bit pattern.

5. The computer system of claim 1, wherein the resonance detector uses frequency analysis.

6. The computer system of claim 4, wherein the resonance detector is responsive to a harmonic frequency of a resonant frequency of the power distribution network.

7. The computer system of claim 1, wherein the damping element is at least one selected from the group consisting of an analog circuit, a switch, and a potentiometer.

8. The computer system of claim 1, wherein the resonance detector controls the damping element in a manner selected from the group consisting of bang-bang control, and proportional, integral, differential control.

9. The computer system of claim 1, wherein the resonance detector is operatively connected between the first integrated circuit and the receiving integrated circuit.

10. The computer system of claim 1, wherein the resonance detector comprises a transmission buffer that stores data before the data is transmitted to the receiving integrated circuit.

11. A method for reducing a power supply resonance, comprising:
    propagating at least one voltage potential from a power supply to an integrated circuit;
    transmitting data to a receiving integrated circuit from the integrated circuit;
    detecting the transmitting for a transmission that causes the power supply resonance; and
    damping the power supply resonance dependent on the detecting using a damping element residing on the integrated circuit.

12. The method of claim 11, wherein the detecting compares a bit pattern of the transmission to at least one bit pattern known to cause the power supply resonance.

13. The method of claim 11, wherein the detecting uses a frequency analysis on a bit pattern of the transmission.

14. The method of claim 13, wherein the detecting is sensitive to a harmonic frequency of the resonant frequency.

15. The method of claim 11, wherein the detecting affects the damping in a manner selected from the group consisting of bang-bang control, and proportional, integral, differential control.

16. The method of claim 11, wherein the damping lowers a power supply impedance.

17. The method of claim 11, wherein the damping uses at least one of the group consisting of an analog circuit, a switch, and a potentiometer.

18. The method of claim 11, wherein the transmitting uses a transmission buffer.

19. The method of claim 18, wherein the detecting analyzes the data stored in the transmission buffer.

20. An apparatus for reducing a power supply resonance, comprising:
    means for propagating at least one voltage potential from a power supply to an integrated circuit;
    means for detecting a transmission of data from the integrated circuit to a receiving integrated circuit, wherein the transmission causes the power supply resonance; and
    means for damping the power supply resonance using a damping element residing on the integrated circuit dependent on the means for detecting.

* * * * *